July 21, 1964 J. G. WILLIAMS 3,141,677
LOW LEAKAGE MECHANICAL SEAL FOR HIGH PRESSURE PUMPS
Filed Nov. 28, 1960 3 Sheets-Sheet 1

JOHN G. WILLIAMS
INVENTOR.

JOHN G. WILLIAMS
INVENTOR.
BY Daniel H. Bobis
Atty

JOHN G. WILLIAMS
INVENTOR.

United States Patent Office 3,141,677
Patented July 21, 1964

3,141,677
LOW LEAKAGE MECHANICAL SEAL FOR
HIGH PRESSURE PUMPS
John G. Williams, Springfield, N.J., assignor to Worthington Corporation, Harrison, N.J., a corporation of Delaware
Filed Nov. 28, 1960, Ser. No. 66,684
8 Claims. (Cl. 277—3)

This invention relates generally to mechanical seals for rotating shafts or members disposed to extend into a region of very high pressure, and more particularly to a face type mechanical seal for such shafts or members utilizing the principle of controlled or limited leakage.

In high pressure fluid circulating systems such as a boiler feed system in a power station, the use of conventional drives requires a shaft extending from the region of atmospheric pressure where it is coupled to the prime mover into a region of very high fluid pressure, which arrangement presents a severe seal problem because of leakage across the shaft.

To avoid this problem various prior art devices such as canned rotor motors and wet pumps have been utilized.

However, the economic and engineering advantages of using conventional drives are of sufficient importance to warrant consideration of seal devices which either stop or limit such leakage across the shaft. Thus, various controlled leakage type and face type mechanical seals have been developed and are known in the prior art.

The controlled leakage type seal attempts to establish a flow orifice to control the leakage. Unfortunately at pressures in excess of 400 p.s.i. and more particularly at pressure in excess of 1000 p.s.i., which is the area to which the present invention is particularly applicable leakage becomes excessive and two difficulties develop, as follows:

(1) An auxiliary pumping arrangement is required for the seal itself, and (2) The efficiency of the circulating system in which the seal is being utilized is adversely affected by the leakage.

In conventional face type mechanical seals applied to such higher pressure sealing wherein a rotatable element and a stationary element form a coacting sealing face therebetween, in order to secure the attempted zero leakage condition the seal must be exactly balanced to avoid excessive loading between the rotatable and stationary elements, as the fluid film thickness between these elements is so small excessive loading will cause physical contact resulting in wear and finally mechanical breakdown.

To illustrate the problem, investigation and analysis of conventional face type mechanical seals which include a rotatable element and a stationary element wherein one of the elements is self-lubricating, shows that the operation of such seals depends on the balancing of forces acting across the seal face so that a continuous fluid film thickness will be present between the rotating element and the stationary element. However, this fluid film thickness must be maintained at not less than $50 \times 10^{-6}$ of an inch if the seal is to produce the desired result and this is where the problem arises because the inherent physical character of the materials used and the inability to maintain manufacturing tolerances provide seals in which the balancing of the forces cannot maintain this operative condition and as a result in the presently known seals, early mechanical failure can be expected.

In my copending application, U.S. Serial No. 29,648 filed May 17, 1960, now Patent No. 3,085,808, a mechanical face type seal is disclosed employing hydraulic forces for self-balancing and at the same time using a minimum leakage, set by means of an external orifice of predetermined size for the purpose of obtaining a predetermined film thickness between the sealing faces of the rotatable element and the stationary element of the seal so that continuous hydrodynamic lubrication is achieved.

The seal disclosed in such copending applications operated well within certain pressure ranges provided the shaft sizes were limited.

Results indicated that at a pump pressure of 5000 p.s.i. a shaft size of approximately 1″ will work well, and at a pump pressure of 1000 p.s.i. shaft sizes up to approximately 4″ will work well. However, outside these pressure and shaft ranges certain of the elements in the seal were either overstressed or so disproportionately large that the commercial feasibility of the seal was seriously affected.

The present invention is designed to overcome this problem and to provide a seal which will operate not only in the pressure and shaft range above set forth but also in ranges in excess of these pressure ranges and shaft sizes.

Thus the present invention covers a mechanical face type seal which includes a rotatable element and a stationary element, which latter element is pivoted for universal swivel-type movement relative to the rotatable member and responsive to differential pressure forces established with variations in the predetermined film thickness between the rotatable element and stationary element pre-set by means of an external orifice of predetermined size to control and limit the leakage past the sealing faces between the rotatable element and stationary element.

This type seal is characterized by the fact that the controlled leakage to a reservoir at atmospheric pressure is virtually zero or stated another way, the final breakdown pressure is in the order of 10 p.s.i. or less. This factor is advantageous because it is difficult to obtain conventional face type seals for relatively large shafts having a diameter in excess of 12 inches at pressures in excess of 50 p.s.i.

Accordingly, it is an object of the present invention to provide a controlled or limited leakage type seal for a rotatable shaft wherein the leakage between the rotatable and stationary elements of the seal is established to provide a predetermined fluid film thickness.

It is another object of the present invention to provide a controlled or limited leakage type seal for a rotatable shaft having an external orifice to set the desired fluid film thickness for optimum and effective operation.

It is a still further object of the present invention to provide a limited leakage seal which is particularly adapted for pumps operating at pressures from 2000 p.s.i. to 5000 p.s.i. with corresponding shaft sizes generally inverse to these pressure ranges from 20 inches down to 2 inches in diameter.

This and other objects and advantages of the invention will become evident from the following description with reference to the accompanying drawings in which:

FIGURE 3 is an enlarged view of the swivel arrangement for the stator.

FIGURE 4 is a front view of the rotatable element of the seal.

FIGURE 5 is a side view taken on line 5—5 of FIGURE 4.

Figure 1:
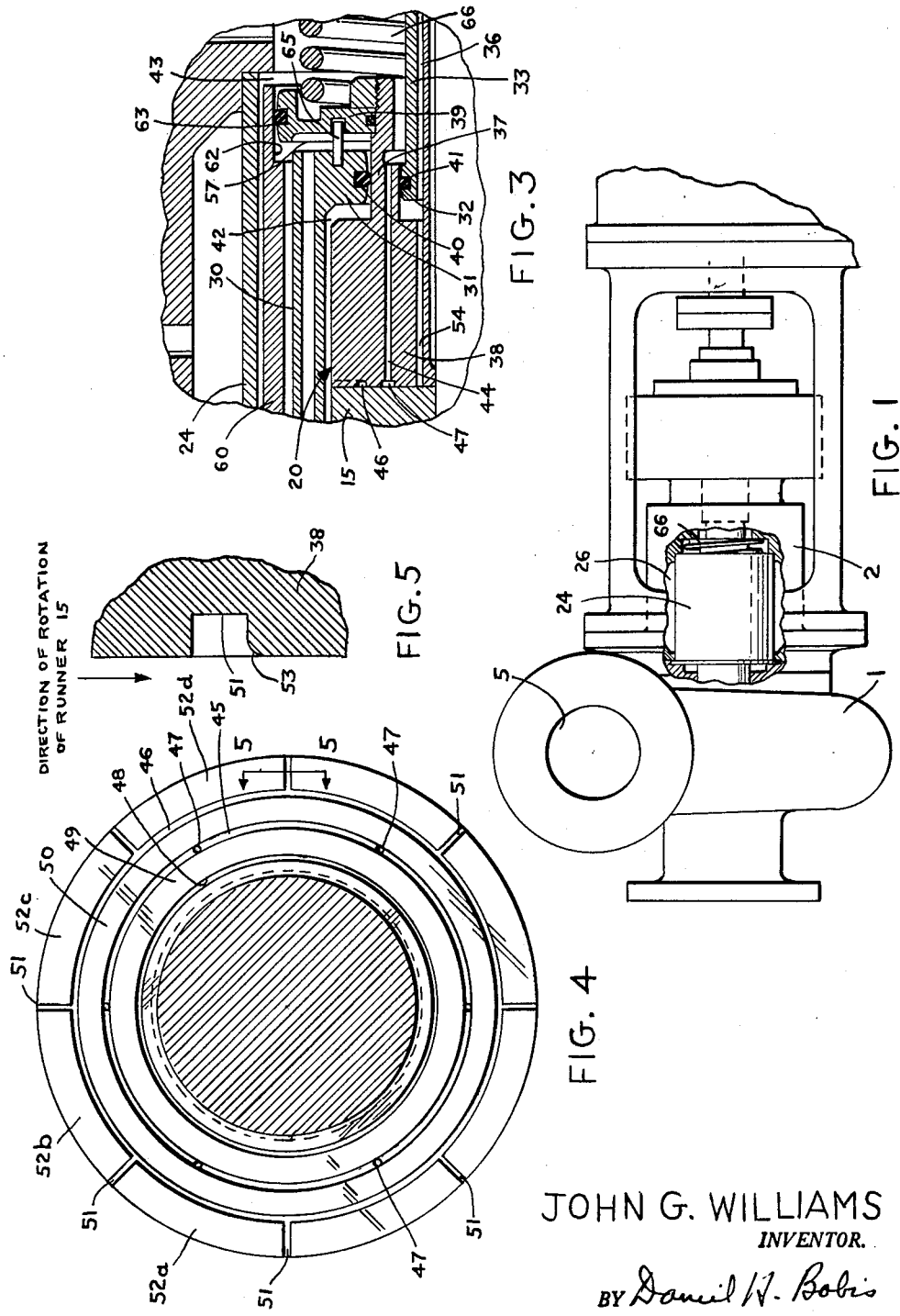
FIGURE 1 is a side elevation of a circulating pump for a high pressure fluid circulating system partly broken away to show a side view of the invention in assembled position.
Figure 2:
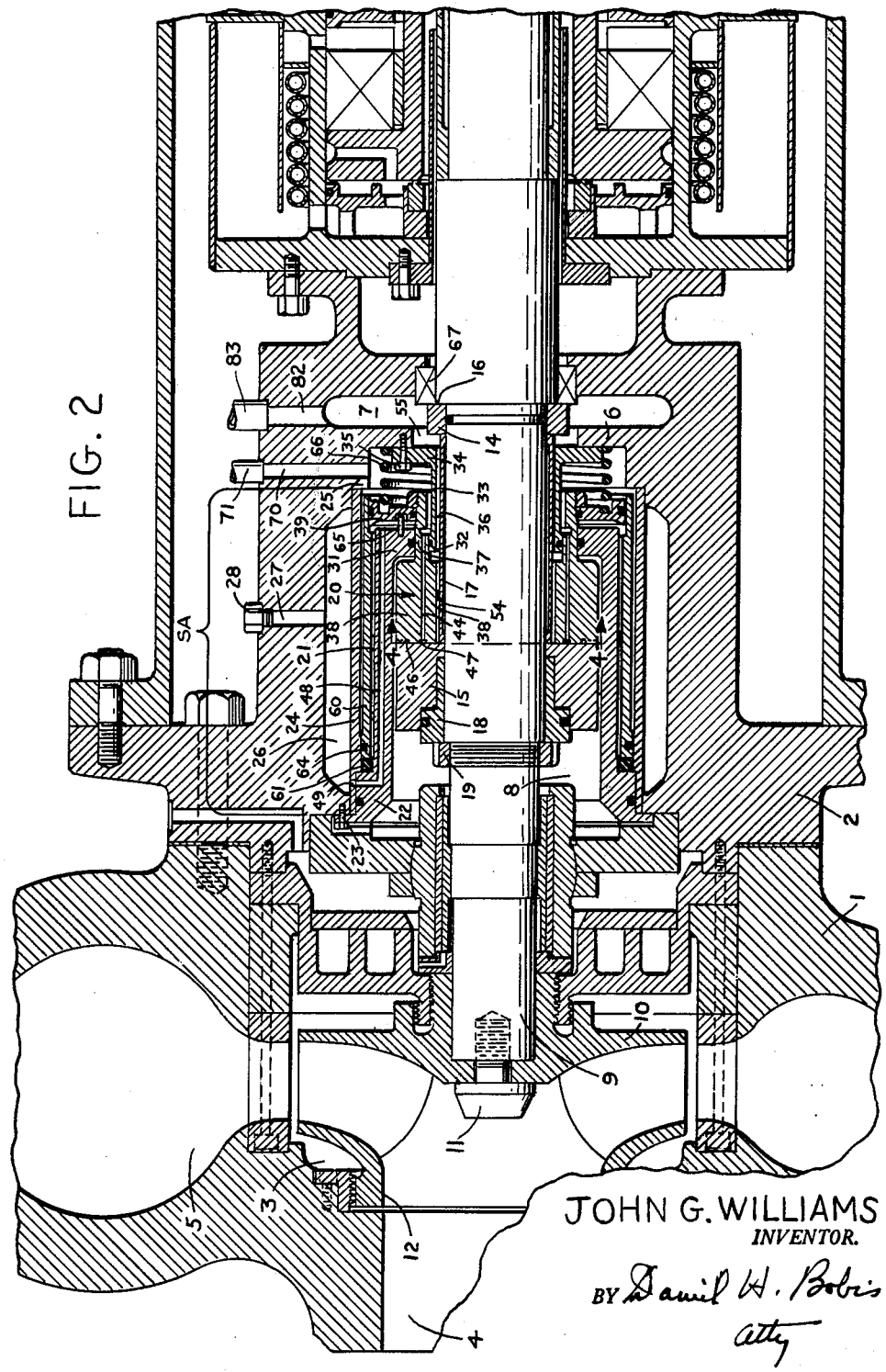
FIGURE 2 is a cross-section of the invention as applied to the circulating pump shown in FIGURE 1.

Referring to the drawings, FIGURES 1 and 2 show a pump for a high pressure fluid circulating system having a casing 1 and a seal housing 2 connected or formed integrally therewith.

The casing forms an impeller chamber 3 having a centrally disposed suction inlet 4 and a discharge outlet 5 communicating with the periphery of the chamber.

The seal housing 2 has a hollow cylindrical shape and is so arranged that a transverse member 6 forms an outer seal chamber 7 and an inner seal chamber 8, which latter chamber communicates with and receives fluid from the impeller chamber as hereinafter described.

A shaft 9 extends through the outer seal chamber 7, the partition 6 and the inner seal chamber 8 into the impeller chamber 3 where it receives the impeller 10 on its inner end by any suitable means such as the threaded member 11.

If it is assumed that the fluid being pumped is at high static pressure at all times and fills the impeller chamber 3, then when the shaft 9 is rotated by any suitable type of prime mover (not shown), fluid passed from the suction inlet 4 to the suction eye 12 of the impeller 10, it will pass through the impeller 10 to the impeller chamber 3 and thence to the discharge outlet 5. This operation is well known in the art and therefore is not more fully described.

Since the shaft 9 will enter from a point at atmospheric pressure or at least relatively lower pressure than the pressure of the fluid in the impeller chamber 3, leakage will occur across the shaft from the zone of high pressure fluid, by reason of the differential pressure which exists. This leakage with the prior art sealing devices has been so excessive as to render prior seals relatively ineffectual.

In the present invention the structure now to be described relies on controlling or limiting the leakage rather than attempting to obtain a zero leakage condition.

The seal is a combination arrangement wherein the pressure is broken down by a first high pressure mechanical seal to a pressure which can be taken care of by a second standard-known type of conventional low pressure seal, i.e., one that operates effectively at pressures less than 100 p.s.i.

The seals are disposed relative each other so that the low pressure mechanical seal falls in the outer seal chamber 7 and the high pressure mechanical seal falls in the inner seal chamber 8.

In order to accomplish this the rotatable elements or runners 14 and 15 of the respective low and high pressure mechanical seals are mounted to the shaft 9 in the following manner. The low pressure or outer runner 14 abuts the shoulder 16 provided on the shaft, and a sleeve 17 about the shaft in turn abuts the opposite face of the runner 14 and acts as a spacer against which the high pressure or inner runner 15 can be fixedly positioned as by a second spacer 18 and threaded element 19 disposed about the shaft which acts to lock the entire assembly in the desired spatial relationship.

It is believed clear from the above that great care is taken in the assembling of the respective outer and inner runners 14 and 15, and with respect to the inner runner 15 that the construction is made with the highest order of precision. This is important to produce the desired type of accurate seal required.

Unfortunately, however, the associated parts of the assembly which mount the runners 14 and 15 to the shaft and, the shaft itself although also made with the highest order of precision are nonetheless mechanical parts and are therefore subject to the machining variation; the distortion produced when the member 19 is drawn up to position the runners 14 and 15; and variations due to the high pressure acting on the elements; temperature variations and other factors will cause sufficient deviations in the position of the runners 14 and 15 that the contacting or seal faces of the runners will not stay in absolute parallelism but will "run out" in an extent particularly important with the high pressure or inner runner 15 of about $.5 \times 10^{-3}$ of an inch for a 1¾ inch diameter shaft to a $3 \times 10^{-3}$ of an inch for a 20 inch diameter shaft.

To meet this problem which is at maximum importance when the system is operating at high pressure because small variations in movement will affect the fluid film thickness, the stator 20 is constructed and arranged to be self-adjusting and designed for swivel operation by the arrangement generally designated SA and shown in enlarged form at FIGURE 3 of the drawings as disposed in the inner seal chamber 8 about the shaft at a point to permit coaction between the stator and the inner runner 15 to correct this and other defects which cause excessive leakage between the rotatable member or inner runner 15 and the non-rotatable member or stator 20 of the high pressure mechanical seal.

*High Pressure Mechanical Seal*

Accordingly, referring to FIGURE 2, we find the adjustable stator generally designated 20 is mounted in position by a cylindrical member 21 connected relative the wall of the inner seal chamber 8 by any suitable means such as the annular base 22 on the cylindrical member 21 and threaded member 23.

A cylindrical sleeve 24 about the cylindrical member 21 is held at one end by the annular base 22 and by shoulder 25 in the wall of the inner seal chamber 8 so that in assembled position it delineates an air chamber 26 which connects through port 27, and vent 28 to atmospheric pressure. This air chamber 26 and cylindrical sleeve 24 acts as heat insulators for the seal.

Continuous with the annular base 22 and extending axially away from the impeller 10 is a cylindrical body portion 30 in turn provided with an inturned annular flange 31 at the end remote from the annular base 22.

Coacting with the inner end of the inturned annular flange 31 is outturned end 32 of an annular collar 33 which extends axially along the shaft 9 to permit an outturned annular flange 34 thereon to provide means for connecting the collar 33 as by threaded members 35 so that the outturned end 32 coacting with the inturned annular flange 31 of the cylindrical member 21 will be disposed in spaced relation to the inturned annular flange 31 and between the flange 31 and the sleeve 17 for purposes more fully set forth below.

FIGURE 2 further shows that the inner diameter of the collar 33 is greater than the outer diameter of the sleeve 17 so that in assembled position an annular space 36 is formed therebetween.

The inturned annular flange 31 and the outturned end 32 of the annular collar 33 adjacent thereto coact to guide and swivel the stator 20 of the seal during operation. They provide pivots or fulcrum points for the universal movement of the stator 20 necessary to meet the "run out" characteristics of the rotatable element or runner 15.

The stator 20 shown in FIGURES 2 and 3 include an annular neck portion 37 which extends in assembled position through the space formed between the inturned annular flange 31 and outturned end 32 of the annular collar 33. On the impeller end of the annular neck portion 37 a stator nosepiece 38 is formed, having a seal face as shown in FIGURE 4 of the drawings. At the end of the annular neck portion 37 remote from the impeller end, a transversely disposed piston member 39 is connected.

The annular neck portion 37, the inturned flange 31 and outturned end 32 have O ring seals 40 and 41 therein to form a sealing space 42 and a piston space 43 in the inner sealing chamber 8 such that the rotatable element or runner 15 and the associated stator nosepiece 38 coacting therewith lie in the sealing space 42 while the piston member 38 of the stator 20 lies in the piston space 43.

High pressure fluid entering the inner seal chamber 8 therefor communicates with the sealing space 42 and acts between the face of the rotatable element or runner 15 and the adjacent seal face of the stator nosepiece 38.

FIGURES 2, 3 and 4 further show that the stator has a plurality of axially extending passages 44 which open at one end on the seal face so that pressure fluid acting at the seal face will pass therethrough. The end of the passages 44 remote from the seal face communicates with the piston space 43 so that the pressure of the fluid delivered to the piston space 43 will be acting on the rear or outer face of the annular piston flange 39 or the face thereof remote from the impeller 10.

The seal face for the rotatable element or runner 15 is smooth and flat and will be machined within the minimum tolerance obtainable.

FIGURE 4 shows that the seal face for the stator 20 has two circumferentially spaced concentric grooves therein as at 45 and 46. The inlets 47 of the passages 44 open into the innermost groove 45, and the portion of the seal face between the inner annular wall 48 of the stator 20 and the groove 45 form the low pressure breakdown land or surface 49 for the seal. Between the inner groove 45 and the outer groove 46 the high pressure breakdown land or surface 50 is formed, and grooves 51 extending radially inward from the periphery of the stator 20 to the outer grooves 46 delineate a plurality of pads as at 52a, 52b, 52c and 52d, etc., which pads serve to provide means for developing the hydrodynamic film during operation of the seal which serves to square the face of the stator 20 to that of the rotatable member or runner 15.

It will be noted that FIGURE 5 shows that the trailing edge 53 of the grooves 51 are rounded to facilitate the formation of the hydrodynamic film between the seal faces of the rotatable element or runner 15 and the stator 20 when the runner 15 is rotating in the direction indicated. In the case of a reversible pump both edges would be rounded to facilitate this operation.

FIGURES 2 and 3 further show that the inner annular wall 48 of the stator 20 has a greater diameter than the outer diameter of the sleeve 17 so that an annular space 54 is formed therebetween. This is important because this construction of the seal face of the stator provides two restrictive flow paths for the flow of leakage fluid as is hereinafter described.

The annular space 54 communicates with the annular space 36 in turn connected through annular connecting chamber 55 to the low pressure seal chamber 7. Thus any pressure fluid which reaches the annular space 54 can be passed to the low pressure seal chamber 7, which chamber is sealed against leakage by means of any suitable conventional type seal designed to operate within this pressure range.

Similarly, a portion of the pressure fluid which reaches the inner groove 45 will pass through inlet 47 and passage 44 to the piston space 43 where it will act on the rear face of the piston flange 39 to provide the balancing force necessary to obtain the desired type of operation.

In order to provide a reference pressure against which the seal works, means are provided to form a chamber 57 associated with the front or inner face of the piston flange 39, which chamber is in communication with atmospheric pressure or a relatively low reference pressure by means of the passage 48 in the cylindrical member 21, and port 49 in the sleeve 24 which communicates the end of the passage 48 with the air chamber 26.

However, this requirement for operation meets two problems. First the chamber 57 must be sealed from the piston space 43 and second, the seal means for the chamber 57 must not affect the sliding and angular movement of the piston flange 39 which occurs during operation.

These problems are overcome by providing, as shown in FIGURES 2 and 3, a freely floating annular sleeve 60 disposed between the cylindrical portion 30 of the cylindrical member 21 and the protective sleeve 24 which coacts with the peripheral portion of the piston flange 39.

The freely floating annular sleeve 60 at one end abuts a resilient element or rubber O ring 61 which is held or is seated in the pocket formed by the annular base 22, the sleeve 24 and the cylindrical neck 30 of the cylindrical member 21.

As shown in FIGURE 2, the sleeve 60 has sufficient length to permit it in assembled position to extend into the piston space 43 beyond the periphery of the piston flange 39 of the stator 20. The portion of the sleeve 60 extending beyond the piston flange 39 is counterbored as at 62 for the periphery of the pison flange 39, to permit the periphery to slide or turn about a plane transverse to the axis of the shaft as is required during the operation of the seal.

O rings 63 and 64 in the periphery of the piston flange 39 and outer surface of the freely floating sleeve 60 seal the piston space 43 from the atmospheric chamber 57.

The startor 20 is prevented from rotating by a dowel or pin 65 and the element is loaded relatively lightly by a spring element 66 mounted in the piston space 43 so that one end abuts the partition 6 and the other end contacts the rear or outer face of the piston flange 39 of the stator to hold the elements in position when the seal is not operating.

*Low Pressure Seal*

The low pressure seal shown in the present invention includes a runner 14 and a stator 67 disposed in face-type sealing engagement. While this type seal is shown it will be understood that any suitable seal of which there are several available on the open market could be utilized for this purpose without departing from the scope of the present invention.

*Means for Controlling Leakage*

In order to secure the desired operation, it is necessary to maintain a predetermined fluid film thickness between the interrelated seal faces of the rotating element 15 and the stator 20 of the seal.

This is done by regulating the leakage of fluid between the seal faces of these elements.

Thus, high pressure fluid leaks into or enters the seal from the seal space 42 through the radial grooves 51 and moves freely into the groove 46. Due to the configuration of the grooves and the pads 52, 52b, 52c, etc. when the runner 15 is rotated this fluid will permit the pads to build up the hydrodynamic fluid film necessary for proper operation of the seal.

As the leakage fluid acts across land 50 it will go through a pressure breakdown and a portion of the fluid which reaches the inner groove 45 will pass through the inlets 47 and passages 44 to the piston space 43 where it will act against the rear face of the piston flange 39 to provide the self-adjusting operation hereinafter described. The remaining portion of the leakage fluid at the reduced pressure will go through further pressure reduction as it moves across the land 49 to the annular space 54. Fluid reaching the annular space 54 will pass to the annular space 36 between the collar 33 and the sleeve 17 and thence through the annular connecting passage 55 to the low pressure chamber 7.

If the respective pads 52a, 52b, 52c, etc., and the lands 49 and 50 of the seal face on the stator 20 are properly proportioned, nearly all the fluid leaking between the interrelated faces of the runner 15 and the stator 20 can be directed through the passage 44 to the piston space 43. Therefore, if the leakage from the piston space 43 can be controlled then the fluid film thickness acting between the interrelated seal faces of the runner 15 and stator 20 can also be controlled.

Figure 6:
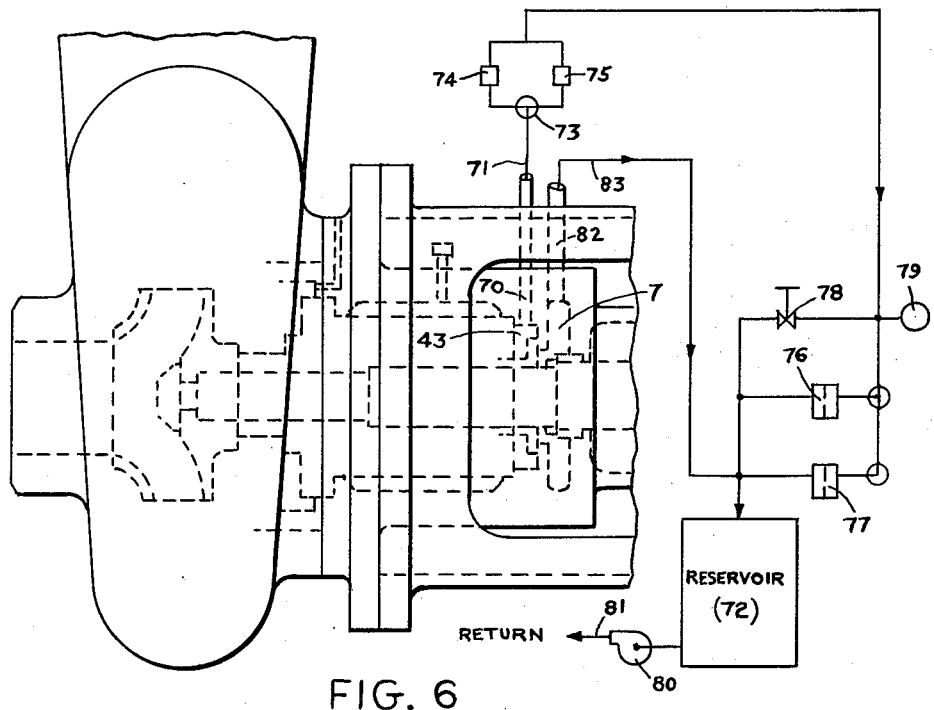
FIGURE 6 is a diagrammatic sketch of a circuit for adjusting film thickness having a fixed orifice.

FIGURES 2 and 6 of the drawings show that this is accomplished by connecting the piston space 43 by suitable lines and connections to a reservoir.

Thus, piston space 43 is connected by port 70 to a conduit 71 in turn connected to a reservoir 72. A three-way valve 73 permits the leakage fluid to flow through one or the other of the filters 74 and 75 disposed in the line 71.

The fluid flow through the line 71 is regulated by a working orifice 76 or a stand-by orifice 77 also disposed in the line 71. While the orifice is diagrammatically illustrated as of the fixed type, it may be a variable type orifice, as is shown in the copending application Ser. No. 29,648.

The working orifice 76 will be sized so as to produce a flow rate and a back pressure such that the film thickness of the pressure fluid will be in the order of $200 \times 10^{-6}''$ and the stand-by orifice will be sized to produce a lesser film thickness so that the leakage will be minimal when the pump or rotatable element being sealed is not in operation.

Line 71 is also provided with a bypass valve 78 and pressure gauge 79.

The fluid collected in the reservoir 72 can be returned to the circulating system or other source by a return pump 80 and return line 81.

In addition to the fluid which leaks through passage 44, some portion of the fluid at a much lower pressure, approximately 10 p.s.i., will leak to the low pressure seal chamber 7 as above described.

This fluid also passes or flows from chamber 7 to the reservoir 72 by way of the port 82 and connecting line 83 which terminates downstream of the working orifice 76 and stand-by orifice 77.

*Operation*

In assembled position, the stator 20 is adapted to coact with the associated edges of the inturned flange 31 and outturned flange 32 and the O rings 40 and 41 thereon so that it can swivel and pivot angularly in all planes transverse to the axis of the shaft 9. This movement is virtually unrestrained at the piston flange 39 which by reason of its pivotal relation with the freely floating sleeve 60 can also deflect a sufficient amount without affecting the sealing arrangement between the piston space and the reference pressure chamber 47.

Figure 7:
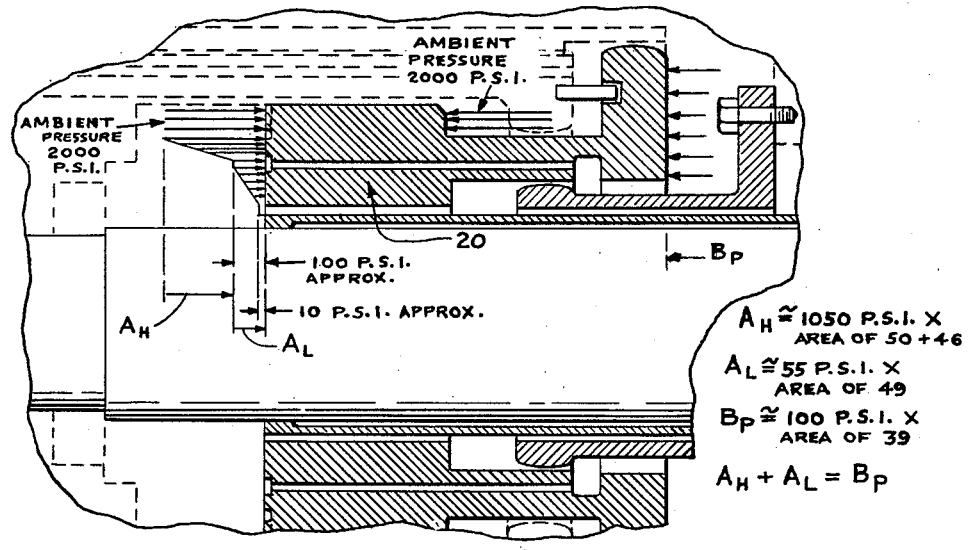
FIGURE 7 is a differential pressure force diagram for the stator element of the seal.

Whether the seal faces of the runner 15 and stator 20 are at static conditions or in dynamic relation, high pressure fluid leaking between and acting against the interrelated seal faces of the runner 15 and the stator 20 will produce an outwardly directed axial force designated $A^H$ for the high pressure breakdown land 50 and $A^L$ for the low pressure breakdown land 49 in the differential force diagram of FIGURE 7.

Conversely, the pressure fluid which leaks to the piston space 43 of the inner seal chamber 8 where it acts on the rear or outer face of the piston flange 39 will exert an inwardly directed axial force designated $B^p$ in the differential force diagram of FIGURE 7.

Since these forces will be acting on opposite sides of a single element, the stator 20, any differential in these forces will tend to move the stator 20 axially towards or away from the rotatable element 15, thereby adjusting the seal faces to maintain the predetermined fluid film thickness set by the easily accessible orifice 76 disposed exteriorly of the seal housing 2.

This average predetermined fluid film thickness between the respective seal faces of the rotatable element 15 and the stator 20 set as above described is substantially less than the normal "run out" characteristic of the rotatable element 15.

This limitation in fluid film thickness is necessary to prevent excessive leakage of pressure fluid between these seal faces for if these seal faces were maintained at a film thickness equal to or larger than the "run out" characteristic of the rotatable element 15 the resultant leakage would be in the order of one thousand times as great, which leakage would destroy the usefulness of this seal device and fail to overcome the problems of the prior art devices above set forth.

In the present invention, despite the limitations of manufacturing tolerances as above indicated the predetermined fluid film thickness is only in the order of one tenth that of the rotable element 15 "run out." In turn, however, this creates an additional problem, namely, that the stator element must adjust its angular position almost instantaneously so as to maintain substantial parallelism between the coacting seal faces of the stator 20 and the rotatable element 15, to avoid physical contact and consequent wear between these elements.

This will occur in the present invention because the "run out" of the rotatable element 15 as above decribed will produce a differential angular moment against the pads 52, 52b, 52c, etc., spaced radially on one or the other side of the seal face of the stator 20.

The seal is therefore self-adjusting because the excess moment will cause the seal face of the stator 20 to square itself almost instantaneously relative to that of the rotor 15.

The "squaring moment" is in continual operation and permits the seal face of the stator 20 by reason of the universal movement of the stator to adjust itself to meet the "run out" characteristic and to maintain the predetermined fluid film thickness in all planes transverse to the shaft as is necessary to assure hydrodynamic lubrication of the coacting seal faces with the result that long term operation of the seal can be obtained.

As a further advantage of this basic characteristic of the seal the double breakdown of the pressure permits a very small quantity of fluid at relatively low pressure to leak across the shaft in the final sealing step. This fluid will be at a pressure of less than 50 p.s.i.

While this factor of final pressure is not important on shafts of small diameters, it does become important where the shaft sizes are in excess of 12 inches in diameter because commercial mechanical seals for shafts in excess of 12 inches at pressures above 50 p.s.i. are not easily available and if available are not effective for very long periods of time at such higher pressures.

Mechanical seals for large diameter shafts at lower pressures, however, can be obtained and work well because the stresses are relatively light.

While the result and the principle of operation of the present invention is the same as that shown in copending application Ser. No. 29,648, it accomplishes this by an entirely different structure and operation and in particular eliminates the undesirable bending effects produced with the gimbal ring arrangement of the copending application due to the forces acting across this member, particularly at high pressures.

It will be undestood that the invention is not to be limited to the specific construction or arrangement of parts shown but that they may be widely modified within the invention defined by the claims.

What is claimed is:

1. A sealing assembly for sealing a high pressure fluid in a high pressure fluid rotating machine having a shaft journaled in a housing comprising:
   (a) a chamber means formed in the housing,
   (b) a cylindrical means having one end thereof connected to the housing and said means to divide the chamber means into a sealing space portion and a piston space portion,
   (c) a collar means having one end thereof connected to the housing and the other end thereof extending in the direction of the cylindrical means,
   (d) a runner member mounted on the shaft,
   (e) a stator member stationarily mounted in the housing on one side of the runner member to coact with the runner member to form a fluid film therebetween, whereby the high pressure fluid is broken down to a lower pressure fluid which may pass to the piston space portion,
(f) the stator member having a neck portion,
(g) the end of the cylindrical means remote from the housing connection in operatively sealed engagement with one side of the neck portion of the stator member,
(h) the end of the collar means remote from the housing connection in operative sealed engagement with the other side of the neck portion of the stator member,
(i) the end of the cylindrical means and the end of the collar means which are each in engagement with the neck portion of the stator member to coact with one another to support the stator member, to permit the stator member to swivel responsive to the run-out of the runner member, and to permit the stator member to be axially displaced responsive the run-out of the runner member and the changes in thickness of the fluid film, while each of said ends maintain the sealed relationship with the neck portion of the stator member,
(j) piston means formed on one end of the stator member and said means disposed in the piston space portion of the chamber means where the lower pressure fluid therein will act thereon to urge the stator in the direction of the runner member,
(k) sleeve means disposed in free floating relationship between the piston means and the housing, in sealed relationship with each, to permit large displacement of the stator member responsive to the movement of the shaft and runner member and to prevent leakage from the sealing space portion to the piston space portion of the chamber means,
(l) control means operatively associated with the housing to regulate the quantity of fluid flowing between the coacting stator member and runner member and to establish the thickness of the fluid film therebetween.

2. The combination claimed in claim 1 wherein:
the sleeve means is of predetermined axial length to permit the movement of the stator member to be responsive to the largest misaligning movements of the shaft and the runner member.

3. The combination claimed in claim 1 wherein:
(a) the cylindrical means has a body portion extending in a direction substantially normal to the axis of the shaft, and
(b) the sleeve means is disposed radially outward of the body portion of the cylindrical means and in a normally substantially parallel relationship therewith.

4. The combination claimed in claim 1 wherein:
(a) passage means formed in the stator member to communicate pressure fluid from the fluid film to the piston space portion of the chamber means,
(b) the passage means is disposed a pre-set radial distance from the axis of the shaft intermediate the outer radial distance and the inner radial distance of the stator member,
(c) the piston means is of a predetermined area correlated to the radial distance of the passage means whereby the force of the fluid acting on the piston means will balance the force exerted by the fluid film of the coacting stator member and runner member.

5. The combination claimed in claim 1 wherein:
(a) the cylindrical means disposed radially outward of the collar means,
(b) the cylindrical means has an inturned annular flange sealingly engaging the neck portion of the stator member,
(c) the collar means has an outturned end sealingly engaging the neck portion of the stator member,
(d) the inturned flange is in superposition to the outturned end, and the flange and end define a plane about which the stator member will pivot responsive to the run-out of the runner member.

6. The combination claimed in claim 5 wherein:
(a) the plane defined by the inturned flange in superposition to the outturned end lies perpendicular to the axis of the shaft.
(b) the cylindrical means, the collar means, the piston means and the stator member coact wtih each other through the full 360 degrees whereby a fluid film will be continuously maintained between the coacting faces of the stator member and runner member.

7. The combination claimed in claim 6 wherein:
(a) an outer seal chamber means is formed in the housing;
(b) a second passage means formed adjacent the shaft inwardly of the stator member and collar means to communicate the fluid from the fluid film's lowest radial point to the outer seal chamber whereby the buildup of pressure pockets is prevented.

8. The combination claimed in claim 6 wherein:
means extend between the piston means and the flange of the cylindrical means to prevent the stator from rotating with the runner member and the shaft.

References Cited in the file of this patent
UNITED STATES PATENTS

| | | |
|---|---|---|
| 2,128,744 | Hornschuch | Aug. 30, 1938 |
| 2,601,997 | Lewis | July 1, 1952 |
| 2,852,284 | Bryson | Sept. 16, 1958 |
| 2,860,895 | Mosbacher | Nov. 18, 1958 |
| 3,085,808 | Williams | Apr. 16, 1963 |